Figure 1:
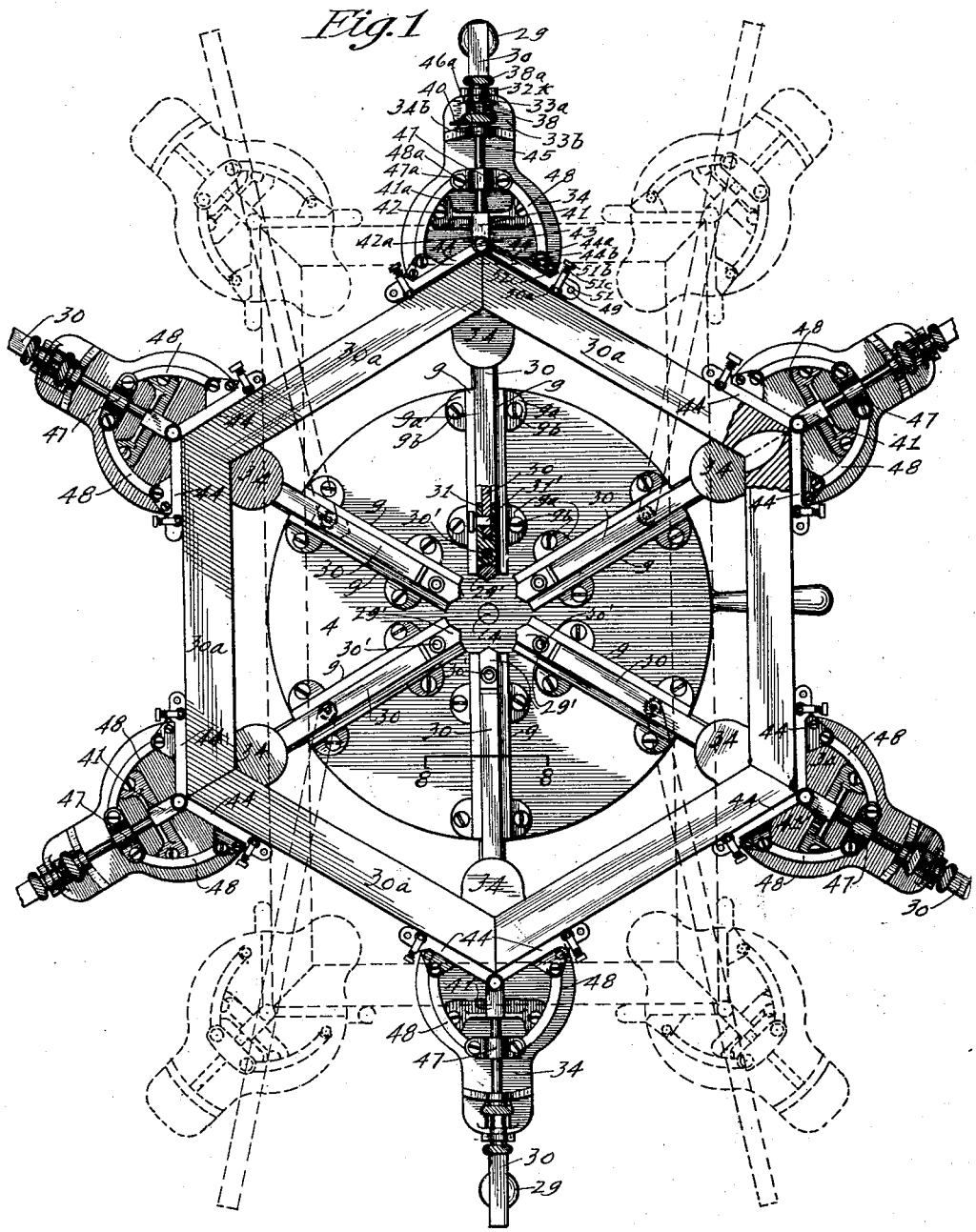

J. & R. DOPYERA.
MACHINE FOR MAKING PICTURE FRAMES AND THE LIKE.
APPLICATION FILED MAY 8, 1916.

1,218,842.

Patented Mar. 13, 1917.
6 SHEETS—SHEET 1.

Witnesses,
Charles H. Weld
George E. Marlatt

Inventors,
John Dopyera, and
Rudolph Dopyera,
Attorney.

J. & R. DOPYERA.
MACHINE FOR MAKING PICTURE FRAMES AND THE LIKE.
APPLICATION FILED MAY 8, 1916.

1,218,842.

Patented Mar. 13, 1917.
6 SHEETS—SHEET 2.

Witnesses,
Charles H. Field
George E. Marlatt

Inventors,
John Dopyera, and
Rudolph Dopyera,
By _____
Attorney.

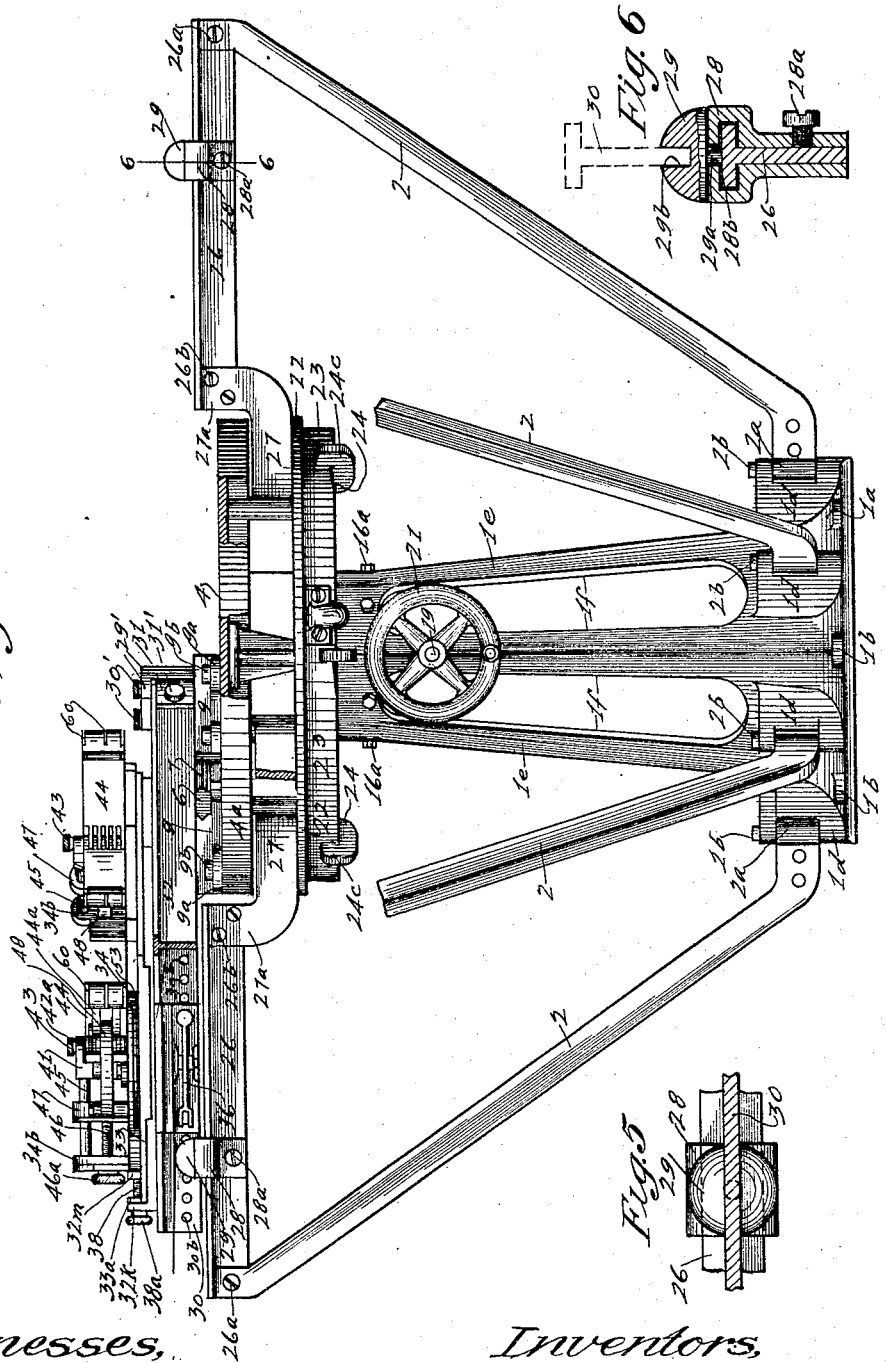

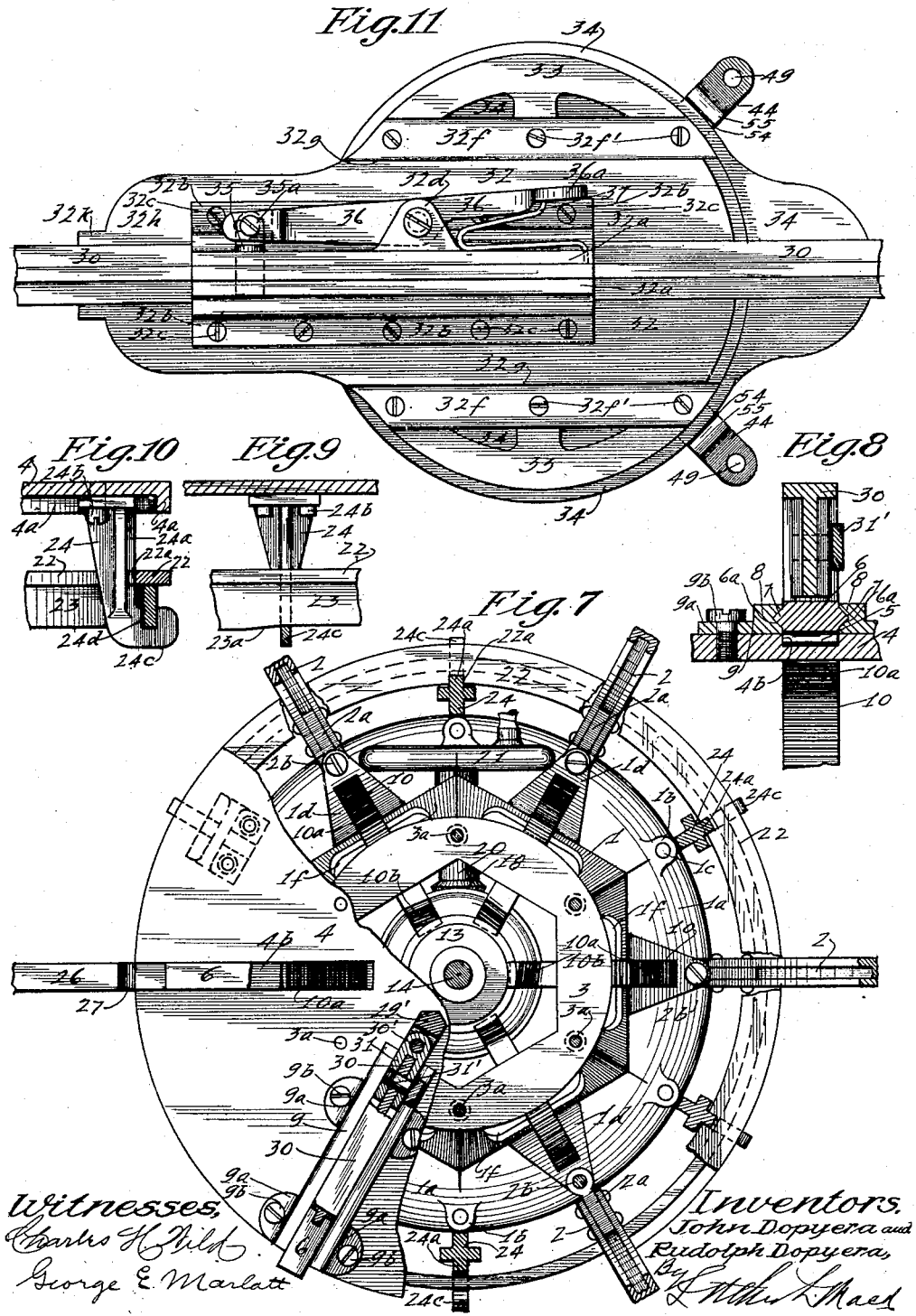

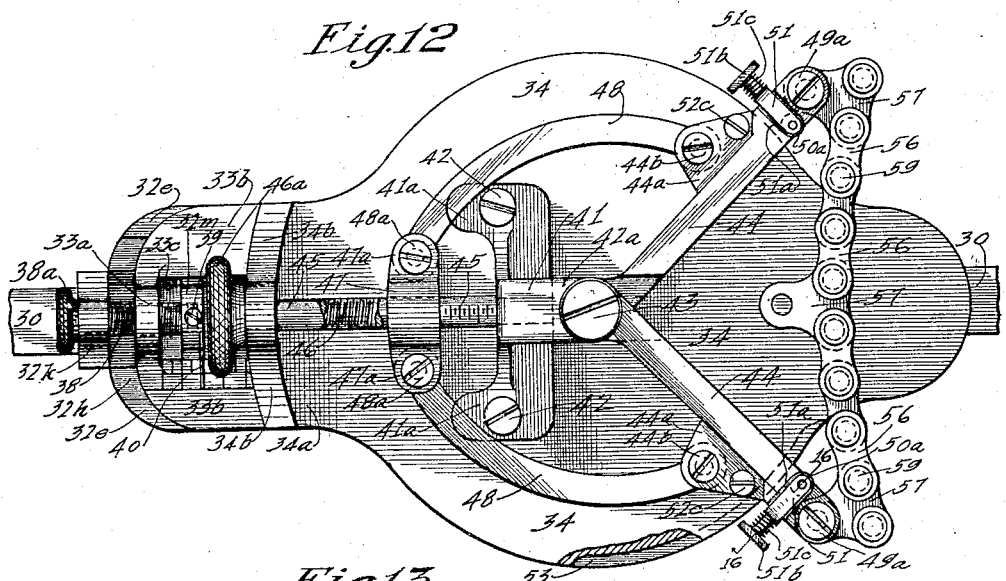

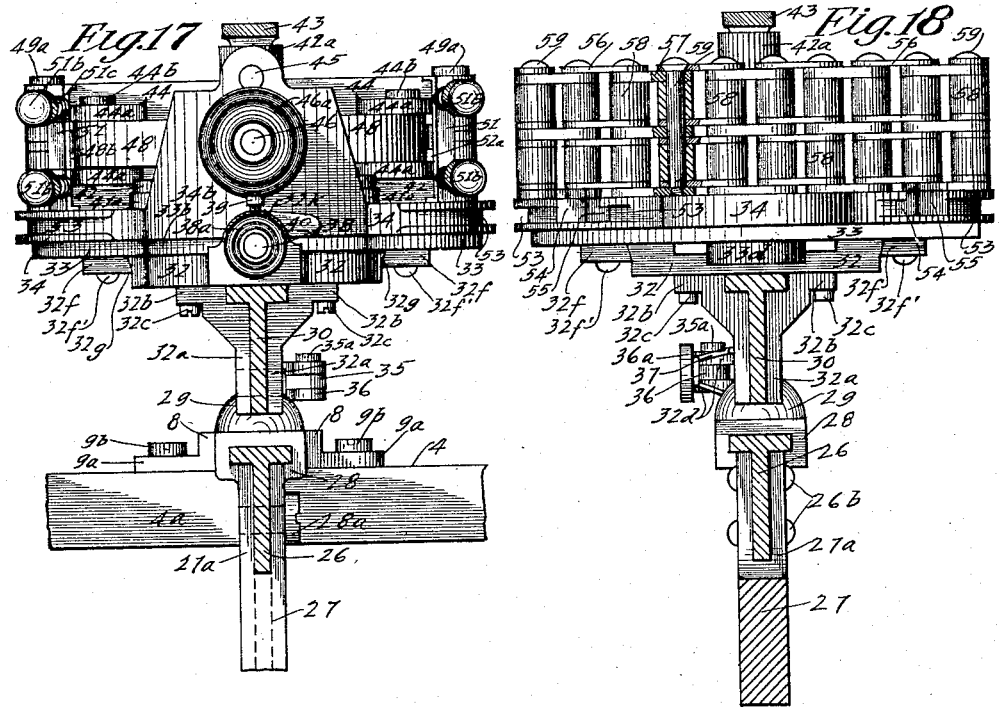

UNITED STATES PATENT OFFICE.

JOHN DOPYERA AND RUDOLPH DOPYERA, OF LOS ANGELES, CALIFORNIA, ASSIGNORS OF ONE-THIRD TO PAUL BERACKA, OF LOS ANGELES, CALIFORNIA.

MACHINE FOR MAKING PICTURE-FRAMES AND THE LIKE.

1,218,842.  Specification of Letters Patent.  Patented Mar. 13, 1917.

Application filed May 8, 1916. Serial No. 97,451.

*To all whom it may concern:*

Be it known that we, JOHN DOPYERA and RUDOLPH DOPYERA, subjects of the Emperor of Austria-Hungary, residing at Los Angeles, in the county of Los Angeles and State of California, have invented a new and useful Improvement in Machines for Making Picture-Frames and the like, of which the following is a specification.

Our invention relates to machines for making picture frames and the like and the primary object thereof consists in the provision of a machine adapted to be used for the manufacture of frames of any form, such as square, rectangular, round, hexagonal and octagonal frames, and the provision of means on the machine for holding the frames rigidly in position during the gluing and doweling operation.

A further object is to provide a single machine of a given type with means for holding and clamping the frame members together without affecting the replacement of certain of the parts, and means for adjusting the frame holding means to the different character of the frames.

A further object is to provide a single operating member for simultaneously operating all of the frame holding members and common means for simultaneously clamping all of the frame members together.

A further object is to provide means for holding and firmly clamping all of the frame members at the intersecting corners, such means being adjustable for regulating the angle of the holders to conform to the proper angle of the frame corners.

A further object is to provide means for adjusting the frame holding means relative to the machine so that both an approximate and fine adjustment may be had, and means on the frame holders and supports therefor for indicating and regulating the extent of movement of the holding means.

A further object of our invention is to provide a plurality of frame holding elements capable of movement about the center of the machine so that any selected pair or more of the holding elements may be used in a single operation, as may be determined by the number and character of the frame sides. Other objects may appear in the detailed description of our invention which will follow.

Similar characters of reference as used in the specification and in the several views of the drawings, indicate the same parts throughout.

Figure 2:
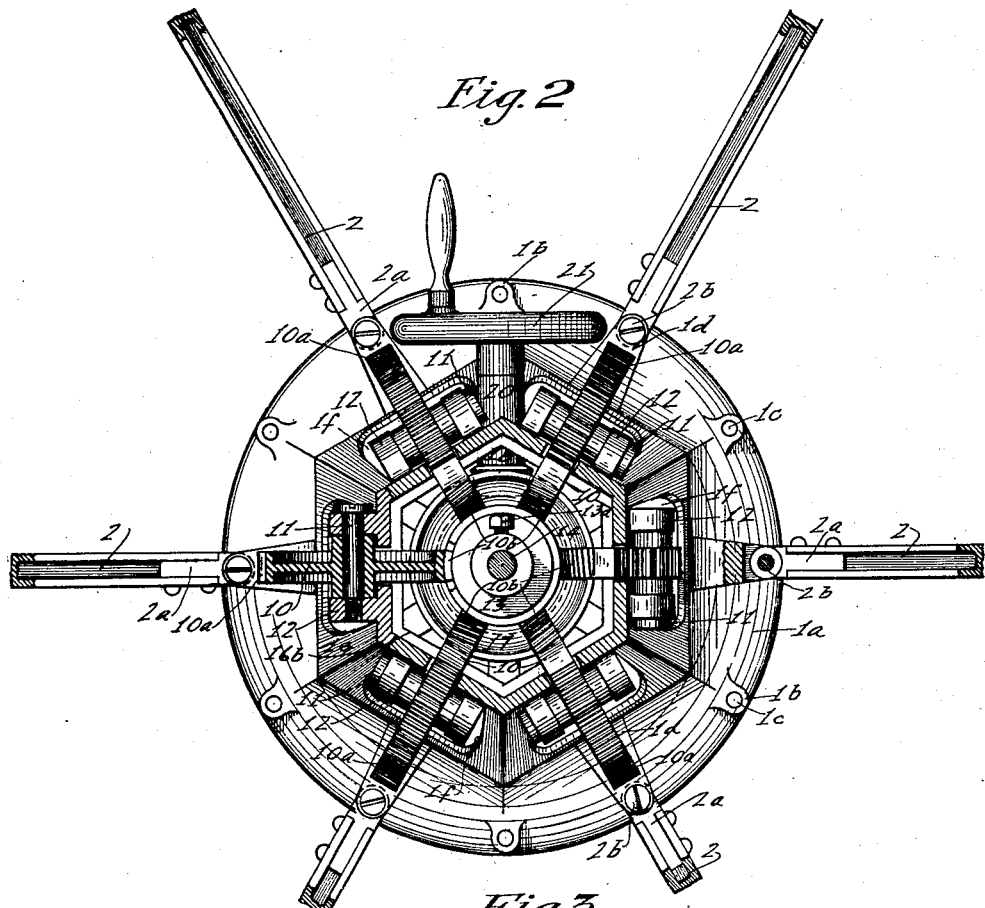
Figure 3:
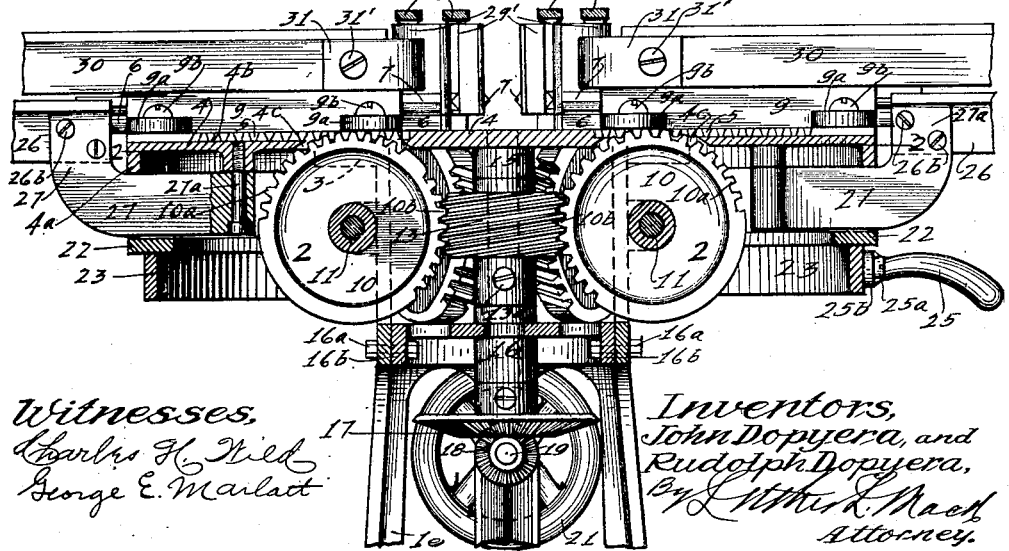

Referring to the drawings, Figure 1 is a plan of our machine showing a hexagonal arrangement of frame holding members with a frame of the same form held therein and a frame of another form represented by broken lines and held on four of the holding members. Fig. 2 is a sectional plan of the machine on the line 2—2 of Fig. 3. Fig. 3 is a sectional elevation of Fig. 1. Fig. 4 is a partial elevation of the assembled machine. Fig. 5 is a fragmentary sectional plan of Fig. 4 on the line A. Fig. 6 is a fragmentary sectional elevation of Fig. 4 on the line 6—6. Fig. 7 is a composite plan of the machine showing the arrangement of parts at several different levels. Fig. 8 is a sectional elevation of Fig. 1 on the line 8—8. Fig. 9 is an enlarged front view of the clamping rings and support therefor. Fig. 10 is a sectional elevation of Fig. 9. Fig. 11 is a bottom plan of one of the frame holding carriages. Fig. 12 is a top plan of the same. Fig. 13 is a longitudinal section of Fig. 12. Fig. 14 is a transverse section of Fig. 12. Fig. 15 is a sectional plan of Fig. 14 on the line 15—15. Fig. 16 is a sectional elevation of Fig. 12 on the line 16—16. Fig. 17 is a rear elevation of the frame holding carriage. Fig. 18 is a front elevation of the carriage shown in Fig. 17 with the chain element shown in Fig. 12 shown attached thereto.

Briefly described, our machine comprises a suitable base with a table superimposed on the top thereof and a plurality of pivoted and inwardly converging arms arranged at regular intervals about the center of the base and table. Each of the arms is extended outwardly from the edge of the table for a convenient distance and carries a pivoted and slidably mounted carriage for holding the intersecting ends of the picture frames, as shown in Fig. 1. The outer ends of the arms are arranged to move pivotally and in an eccentric path relative to the center of the table and the inner ends of the arms are arranged to slide on the table and are operated by racks which mesh with gears below the table for effecting a uniform movement of the arms in the clamping operation. The operating gears, as will appear hereinafter, are commonly operable so that a simultaneous movement of the arms may be effected in a single operation.

The holding means are arranged adjustably on the arms and relative to the frames and the frames are placed flatwise, as shown, on the flat surface of the holding carriages, the intersecting ends being doweled and clamped together by the movement of the arms.

The base 1 of the machine has a flange 1$^a$ at the bottom adapted to rest on the floor and suitable bosses 1$^b$ are arranged at regular intervals around the edge of the flange with perforations 1$^c$ through which bolts may be inserted for securing the base to the floor. Lugs 1$^d$ are formed on the base 1 above the flange 1$^a$ which are adapted to pivotally receive the lower ends 2$^a$ of the diagonally extending arms 2, the arms being held in the lugs on screws 2$^b$ and being of channeled form so as to hold the lower ends 2$^a$ firmly between the sides of the channel. A pedestal 1$^e$ extends upwardly from the bottom of the base and has suitable openings 1$^f$ provided in each of the six sides thereof, the operating mechanism of the machine being supported on the pedestal, as hereinafter described.

The top of the pedestal 1$^e$ has a flange 3 which supports the circular table 4 and is secured thereto by means of bolts or screws 3$^a$, the edge of the table having a depending apron 4$^a$. A plurality of grooves 4$^b$ are formed in the top surface of the table 4 and extend on radial lines from points near the center of the table to the outer edge thereof for slidably receiving the teeth 5 on the racks 6 which have tongues 7 formed on the sides above the surface of the table and are slidably disposed in grooves 6$^a$ of corresponding form in the extensions 8 of the guides 9, lugs 9$^a$ being formed on the sides of the guides at each end to receive the screws 9$^b$ by means of which the guides are secured to the table 4.

Gears 10 which are revolubly held on shafts 11 mounted in bearings 12 formed on the sides of the pedestal 1$^e$ of the base are arranged beneath the table 4 in alinement with the grooves 4$^b$ and a plurality of ordinary gear teeth 10$^a$ are formed on a portion of the periphery of each of the gears which extend upwardly through openings 4$^c$ in the grooves 4$^b$ and mesh with the teeth on the racks 6. The inner portions of the peripheries of the gears 10 have diagonally cut teeth 10$^b$ formed thereon which are adapted to mesh with the vertically supported worm 13, there being sufficient space between the two kinds of teeth on the gears to limit the movement of the gears in either direction, and the balance of the peripheries of the gears being void of teeth, as shown.

The worm 13 is attached to the vertical shaft 14 by means of a suitable key or by means of the set screw 13$^a$ and the shaft 14 is journaled in a bearing 15 formed on the table 4 and in the lower bearing 16 which is secured to the pedestal 1$^e$ by means of bolts or screws 16$^a$ extending through the flanged periphery 16$^b$. The lower end of the shaft 14 is extended below the bearing 16 and carries a bevel gear 17 which meshes with a relatively small bevel gear 18 on a transverse shaft 19 which is revolubly held in a bearing 20 formed on the pedestal 1$^e$ at the intersection of two of its sides and midway between the plane of the gears 10 and carries a hand wheel 21 on the exterior of the pedestal by means of which the shaft and gears may be rotated for the purpose of moving the racks 6 on the table 4, as will be hereinafter described.

An annular ring 22 of substantially the same diameter as the table 4 is suspended beneath the table in frictional engagement with and on another ring 23 arranged at right angles thereto and substantially central relative to the ring 22, notches 22$^a$ being formed in the ring 22 which are adapted to be engaged by ribs 24$^a$ on the brackets 24 which serve to support both of the rings. The brackets 24 are secured to and suspended from the table 4 by means of screws 24$^b$ and are arranged in positions midway between the planes of the gears 10, as shown in Fig. 7, the lower extensions 24$^c$ of the brackets having notches 24$^d$ which receive the lower edge of the vertically disposed ring 23 which is provided with slightly inclined portions 23$^a$ at points near the brackets so that a slight movement of the ring to the right will lock the rings 22 and 23 together. The ring 23 may be turned for this purpose by means of a suitable handle 25 attached to the ring by means of screws 25$^a$ through the lugs 25$^b$.

The diagonal arms 2 which are pivoted to the base 1 at the bottoms and secured at their upper ends to the outer ends of the T shaped bars 26 by means of rivets or screws 26$^a$, and the inner ends of the bars 26 are secured rigidly to the upwardly turned extensions 27$^a$ of the brackets 27 by means of rivets or screws 26$^b$, the inner portions of the brackets 27 being pivoted on screws 27$^{a\prime}$ secured to the bottom of the table 4 and in line with the racks 6 and grooves 4$^b$ in which the racks operate. The width of the brackets 27 is substantially equal to the space between the upper side of the ring 22 and the bottom of the flange or apron 4$^a$ around the periphery of the table 4, and as the notches in the inner edge of the ring 22 permit the vertical movement of the ring 22 over the engaging ribs of the brackets 24 when the lower ring 23 is slightly raised when the inclined portions 23$^a$ are forced into engagement with the brackets, the brackets 27 will thus be frictionally held against pivotal movement in such case and for purposes which will hereinafter appear.

Each of the horizontal T bars 26 carries one of the slidable brackets 28 shown in Figs. 4, 5 and 6 and the brackets are cored or milled out to conform to the shape of the T bars so that they may be readily moved thereover to a desired point and they may be locked to the bars by means of set screws 28ª. A swivel top 29 is provided for each of the brackets 28 which has a depending and relatively short stem 29ª adapted to seat in a corresponding bore 28ᵇ in the upper portion of the bracket, the top 29 being provided also with a groove 29ᵇ and being semispherical in form.

T bars 30 of the same form and size as the bars 26 are removably secured at their inner ends to members 31 by means of thumb screws 31′, as shown in Fig. 7, and by means of the members 31 these bars are pivotally held on screws 30′ in the recessed vertically extended portions 29′ of the racks 6. The outer ends of the bars 30 are adapted to slidably seat in the grooves 29ᵇ of the swivel tops 29 of the brackets 28 on the lower bars 26.

The above described arrangement of the T bars 26 and 30 and the diagonal braces 2 permits the movement of the arms composed of these bars pivotally relative to the table 4, the pivot points of the lower bars 26 being stationary near the outer edge of the table 4 and the pivot points of the upper bars 30 being movable radially over the top of the table when the racks are moved, the sliding movement of the upper bars compensating for the distance between the pivot points of the two sets of bars, and the pivot points of the bars 2 and 26 being alined, of necessity.

The picture frame members 30ª, as shown in Fig. 1, are supported in position on suitable carriages on the upper sets of arms 30, one carriage being provided for each of the arms in a machine, and as many of the carriages and arms being used in a framing operation as there are sides to the frame to be made. For instance, six arms being shown in the drawings, all of the arms and carriages would be used for making a hexagonal frame; or if a four sides frame, square or oblong is to be made, only four of the arms and carriages would be used, the arms not in use being swung around into convenient positions out of the way and the arms in use being also moved pivotally until they assume approximately proper positions for use.

The carriages for holding the frame members 30ª are composed of the longitudinally movable but otherwise stationary bases 32 which are adjustable as to position on the bars 30, the central longitudinally adjustable plates 33 and the upper members 34 which are both longitudinally and pivotally adjustable. The base members 32 have depending sides 32ª which are milled out on their inner sides to slidably fit the bars 30 and the upper flanged edges 32ᵇ of which are secured to the members 32 by means of screws 32ᶜ. The webs of the bars 30 are perforated at 30ᵇ to receive the pins 35, as shown in Figs. 13 and 14, and the sides 32ª also have corresponding perforations through which the pin extends for the purpose of locking the carriages to the bars 30. The pins 35 are pivotally connected by means of screws 35ª to one of the ends of the latch levers 36 which are pivoted to and between lugs 32ᵈ on the sides 32ª and have thumb pieces 36ª on the opposite ends by means of which the levers may be depressed for removing the pins 35 from the perforations in the bars 30. Springs 37 are attached at the ends to the sides 32ª and are looped in the center and press against the bottom of the thumb pieces of the levers 36 for effecting the automatic restoration thereof when the pins are moved into position opposite one of the holes in the bars 30.

The bases 32 of the carriages have vertically extended ribs 32ᵉ on the opposite sides and are slidably held in position on the plates 33 by means of dovetailed tongues 32ᶠ which are secured to the bottoms of the plates 33 by means of the screws 32ᶠ′ and are adapted to slidably engage the inclined portions 32ᵍ. The central portions of the plates 33 and 34 are circular in form, the rear portions 32ʰ of the plates 32 being extended substantially at the back and provided with the vertically extended lugs 32ᵏ which carry adjusting screws 38 having knurled heads 38ª. The inner ends of the adjusting screws 38 have annular grooves 38ᵇ which are adapted to be engaged by the inner ends of set screws 39 which are threaded in the vertically extended lugs 32ᵐ on the bases 32 in which the adjusting screws terminate, and the set screws serve to prevent the longitudinal movement of the adjusting screws relative to the lugs 32ᵏ and 32ᵐ.

The central plates 33 are longitudinally adjustable on the base plates 32 by means of the adjusting screws 38 which are threaded through the lugs 33ª on the rear extensions 33ᵇ of these plates between the lugs 32ᵏ and 32ᵐ on the plates 32. A suitable pointer 40 is formed on or suitably attached to each of the innermost lugs 32ᵐ on the plates 32 and move over the upper surfaces of the plates 33 on one of the sides of the openings 33ᶜ for indicating the extent of movement of the plates 33 relative to the plates 32, suitable graduations being provided on the surface of the plates 33 for regulating the adjustment of the plates 32 and 33.

Brackets 41 are secured to the tops of the plates 34 by means of screws 42 extending through the feet 41ª and extensions 42ª are formed on the brackets at the top to receive the pins 43 which extend downwardly through the plates 34 and are screwed into the plates 33 and the bosses 33ᵈ thereon, suitable grooves 33ᵉ being provided in the plates 32 to permit the movement of the bosses 33ᵈ.

Each of the carriages has a pair of pivoted face plates 44 which are pivoted at their inner ends on the pins 43. The rear extensions 34ª of the upper plates 34 have vertical extensions 34ᵇ which are extended to points in line with the tops of the brackets 41 and in which the rear ends of the guide rods 45 and adjusting screws 46 are journaled, the rods 45 being arranged above the screws 46, the screws being provided with knurled heads 46ª for the purpose of effecting the adjustment of the face plates. Both the screws 46 and the rods 45 are reduced at their ends, the front ends thereof being seated in the brackets 41 and the rear ends, as described, in the extensions 34ᵇ, thus preventing the longitudinal movement of the screws and rods. Crossheads 47 which have lugs 47ª on the opposite sides thereof are adapted to receive the rear ends of the links 48 in the recesses between the upper and lower lugs on each side and the links are pivoted to the crossheads by means of pins 48ª. The adjusting screws 46 are threaded through the crossheads 47 and the rods 45 extend through the crossheads and serve to guide the crossheads in their longitudinal movement over the plates 34 when the screws 46 are turned. The forward ends of the links 48 are pivoted to the face plates between the lugs 44ª on pins 44ᵇ; hence the movement of the adjusting screws 46 in either direction will effect a corresponding movement of the crossheads 47 and the face plates 44 to which they are connected by means of the links 48.

The outer ends of the face plates 44 are extended conveniently beyond the peripheries of the plates 34 and are substantially enlarged and provided with bores 49 near their ends to receive the pins 49ª. The forward faces of the plates have recesses 50 in which are seated the rollers 50ª supported at opposite ends on brackets 51 which are slidably mounted on the edges of the face plates in grooves 51ª. Screws 51ᵇ extend through the brackets 51 and are secured in the face plates on the rear sides and carry springs 51ᶜ which compress between the heads of the screws and the faces of the brackets, the springs serving to hold the rollers 50ª extended beyond the faces of the plates so as to present yielding surfaces to the frame members when they are clamped together and thus prevent undue friction between the frames and the plates which might otherwise prevent the movement of the several elements into their proper relation.

A wide groove or recess 52 is formed in each of the face plates 44 on the rear and extends entirely through the enlarged ends of the plates to receive the arms 52ª of the levers 52ᵇ which are pivoted between the lugs 44ª on the face plates on pins 52ᶜ, the arms 52ª being in engagement with the inner sides of the brackets 51 and serving to automatically extend the brackets rearwardly when the angle between the face plates in each set is increased or the plates moved into transverse alinement across the plates 34. The movement of the levers 52ᵇ is accomplished by means of lugs 52ᶜ' thereon being engaged by lugs 48ᵇ on the links 48 and is necessary when the face plates are extended in transverse alinement, for in such relation the face plates present a straight line to the side of the frame and the rollers are not only not necessary but might prevent a positive alinement of the frame members in such case.

As shown in Fig. 12, the guide rods 45 may be provided with suitable graduations to indicate the feet and inches or the degree of the angles between the face plates 44, and if desirable, the tops of the bars 30 may also be provided with a scale for regulating the extent of movement of the carriages on the bars.

The upper plates 34 have grooves 53 formed in their circular peripheries to receive the tongues 54 on the extensions 55 which depend from the ends of the face plates 44, thus serving to guide the outer ends of the face plates in their movement over the carriage plates 34.

It is obvious that the face plates may be adjusted to the angle of the intersecting corners of the frame members of any type of frame having straight sides, but in the event of the necessity or occasion for clamping together the segmental members of circular frames, the face plates would not serve, hence the provision of the chain shown in Figs. 12, 13 and 18. This chain is composed of two kinds of links 56 and 57 arranged in the usual manner common to sprocket chains and having rollers 58 between the links. The links are held together and the rollers in place on vertical pins 59. The links 57 have three eyes while the links 56 have the usual two eyes, the third eye in the links 57 serving to fasten the ends of the chain to the ends of the face plates 44 on the pins 49ª and there being three of these links in vertical alinement at regular intervals throughout the length of the chains. The ends of the face plates 44 are cut out at 60 in the center, top and bottom to provide clearance for the links 57 and the rollers between the links in the chains are preferably as close together as possible so as to present a regular surface to the edge of the frame. When the chain is used, the face plates are set at a suitable angle, depending upon the length of the chains and the diameter of the frames, and the chains attached to the face plates by means of the pins 49ª.

While our frame making machine may be used to very great advantage in every case where accuracy is required and a perfect alinement of the frame members, regardless of the number of frames of a particular size or form to be made, the machines are especially adapted to facilitate the work when a large number of frames are to be made of a certain size and form, such as would ordinarily be the case in large manufacturing establishments. When a large number of the frames are to be made the machine may be adjusted to the approximate size of the frames, and the surplus carriages may be removed from the T bars 26 and 30, that is to say, if a particular machine is equipped with six carriages and arms and only four of the carriages are required to make the frames, then the two surplus carriages may be removed bodily from their supporting bars, as a matter of convenience.

As a usual thing, the frame members are not nailed or bradded together, but are doweled and glued, one form of dowel being shown in Fig. 1. In this particular form of frame the ends of the frame members are grooved by a circular saw, or otherwise, and the flat dowels or inserts 61 are forced into the groove at one end of each of the members. The several frame members are then placed flatwise in the machine with the ends resting on the flat surface of the carriage plates 34. The face plates 44 are then set to the proper angle to conform to the angle of the intersecting ends of the frame members, the glue is applied to the grooves and dowels in the ends of the frame members, the friction locking ring 23 is turned slightly to the right by means of the handle 25 so as to move the inclined portions 23ª of the ring into engagement with the brackets 24, thus locking the rings and carriage supporting arms against pivotal movement, and the large hand wheel 21 may then be turned for moving the racks 6 on the table 4 to which the arms 30 are attached. This movement of the racks 6 is accomplished through the connections of the bevel gears 17 and 18, the gears 10 and the worm 13, and the movement of the racks effects the movement of the frame holding carriages and bars 30 in the direction of the axis of the table 4, the face plates being forced tightly against the intersecting frame ends and an equal pressure being exerted on all of the frame corners, thus forcing the dowels into the grooves in the ends of the frame members and completing the frame making operation. A reverse movement of the hand wheel 21 will retract the racks 6 and permit the removal of the completed frame from the machine. When a number of frames of the same size and form are to be made it is unnecessary to release the friction ring 23, another frame being placed in the machine and the members thereof secured together as before by the movement of the hand wheel 21.

When all of the arms and carriages of a particular machine are in use, it is obvious that the upper and lower carriage supporting bars 26 and 30 will be in the same radial plane from the center of the table 4, but when only a few of the carriages and arms are used, this will not be the case, for the upper and lower bars of each of the arms are pivoted at different points and the upper bars 30 slide on the lower bars 26. The plates 34 of the carriages being pivotally held on the bars 30 are self adjustable to the proper angle, as shown in broken lines in Fig. 1, according to the character and form of the frames to be made.

It is to be understood that frames of almost any form may be made in our machine, as for instance, for making triangles or other irregular forms. For triangular frames, two of the carriages may be set and adjusted to the angle of two of the corners and two other of the carriages may be set with the face plates extended in a straight line across the plates 34, or, three of the carriages may be adjusted to the different angles of the corners of the triangle, as may be found convenient, the face plates, in the clamping operation, being forced against the two corners and two of the sides, in the first instance, or against all of the corners in the latter instance.

A trapezoidal frame having two parallel sides may be made by setting the carriages to hold the acute angles of the frame and the two parallel sides, and still other forms may be made by arranging the carriages at convenient positions about the table and adjusting the face plates to the proper relative positions and angles on the carriages.

For clamping the segments of circular frames together, the angles between the face plates of the carriages should be increased to correspond to the diameters of the frames and long or short sections of the chains shown in Figs. 12, 13 and 18, used for frames of large or small diameter, as the case may be.

In practice, the machines should be preferably supplied to the trade in various sizes and forms to conform to the necessities, and any number of the frame holding arms may be used on a machine, the adaptability of the machines to various forms of frames being varied according to the number and length of the arms. It is apparent that a greater range of usefulness will be afforded in a machine having twelve arms than in a machine having only four arms, for it would be inconvenient, if not impossible to arrange the arms in a machine having only four of the arms so as to properly hold and clamp a frame having only three sides, but this could easily be done in a machine having six, nine or twelve arms, and the arms in the latter forms of machines would be symmetrically placed about the table. For general use, the twelve arm type of machine is most practical for the reason that twelve is a multiple of 2, 3, 4 and 6, and for circular forms of frames a greater number of arms for holding the segments together while they are being clamped will afford better results than a smaller number of arms.

We do not desire to limit ourselves to the particular form of parts shown in the drawings, for we conceive it to be possible to modify and alter the form and arrangement of parts substantially without enlarging the scope or departing from the spirit of our invention, and we desire to claim broadly on the means for clamping the frame members together.

Having thus described our invention, what we claim is:

1. A machine for making picture frames and the like comprising a base, a plurality of frame holding means supported thereon at regular intervals and adjustable relative thereto, each of said frame holding means including a pair of horizontally disposed arms, the upper arm of which is slidably supported upon the lower arm, said lower arms being supported at their extremities and said upper arms being provided with means for engaging and holding the corners of the frames, and means supported on said base for simultaneously operating all of said arms to accommodate the size and form of the frames to be made.

2. A machine for making picture frames and the like comprising a suitable base provided with a table at the top thereof, a plurality of regularly spaced frame holding means supported on said base and comprising pairs of horizontally disposed arms braced at their outer extremities and slidable relative to each other, adjustable frame holding means carried by the upper arm of each pair, common operating means for said arms supported on said base, and locking means for the arms, as described.

3. A machine for making picture frames and the like comprising a base having a table at the top, a plurality of regularly spaced arms pivoted to said base and extending outwardly from the periphery of said table, additional arms having independent pivotal connection with said table and supported on the outer ends of said first mentioned arms, means carried by said upper arms for firmly engaging and holding the frame members, and means supported on said base for simultaneously moving said arms to correspond to the size and form of the frames to be made.

4. A machine for making picture frames and the like including a plurality of frame supporting members having a common supporting base, each of said means comprising a pair of separately pivoted horizontally disposed arms, the outer ends of the upper arms slidably engaging the lower arms and being provided with adjustable frame clamping means, common operating means for contracting and expanding all of said adjustable frame clamping means, and means for locking the lower arms of each set against action during the frame making operation.

5. A machine for making picture frames and the like comprising a plurality of frame holding members composed of pairs of horizontally disposed arms having a common base and pivotally supported at different points there on, the upper arms of each set being slidable relative to the lower arms and provided with means adjustable to the angle of the frame corners for supporting the frame, common operating means for all of said frame holding means and locking means therefor.

6. A machine for making picture frames and the like including a set of independently pivoted arms slidably supported in pairs, one upon the other, and comprising a plurality of expansible and contractible frame holding units regularly spaced about a common point and capable of adjustment to conform to the size and angle of the frames to be made, common expanding and contracting means for all of said units, and common means for locking said units during the frame making operation.

7. A machine for making picture frames and the like including a plurality of regularly spaced frame holding units composed of a plurality of pairs of extended arms independently pivoted and slidably supported one upon the other, means for commonly adjusting the relation between the lower and upper arms of each pair to correspond thereto, to conform to the size and form of the frames to be made, means for locking said units against action, and means supported on the upper arms and adjustable relative to the angle of the frame corners for supporting the frames rigidly during the operation of the machine.

8. A machine for making picture frames and the like including a plurality of regularly spaced frame holding units comprising pairs of slidably related horizontally disposed arms braced at their outer extremities and independently pivoted to a common supporting base at their inner extremities, angularly adjustable frame engaging means slidably supported on the arms of each unit, common means for extending and moving said unit to correspond to the size and form of the frames to be made, and locking means for preventing the movement of the units during the frame making operation.

9. A machine for making picture frames and the like comprising a plurality of pivotal and extensible frame holding units supported on a common central base at regular intervals, said units including pairs of slidably related horizontally disposed arms diagonally braced at their outer extremities to said base and independently pivoted at their inner extremities, and angularly adjustable frame engaging means supported on said arms and capable of adjustment to correspond to the size and form of the frames to be made, gearing for commonly operating all of said units, and locking means for preventing the movement of the units during the frame making operation.

10. A machine for making picture frames and the like comprising a base having a plurality of spaced frame units supported thereon and means for adjusting said units to the size and form of the frames, said units comprising radially movable members with pivoted arms extending outwardly therefrom, pivotally adjustable supports for said arms, and clamping means supported on said arms for engagement with the frames comprising pivoted face plates adjustable relative to each other to conform to the angles of the frame; and means for locking said arm supports against action at will.

11. A machine of the character described including a base having a plurality of frame supporting units held thereon, carriages supported on and adjustable longitudinally of said units to conform to the size of the frames, longitudinally and angularly adjustable frame clamping means on said carriages for engagement with the periphery of the frame, means for moving the carriages into frictional engagement with and for clamping the frame members together, and means for locking said carriages against pivotal movement when they are set for a particular size of frame.

JOHN DOPYERA.
RUDOLPH DOPYERA.

Witness:
CHARLES H. WILD.

Copies of this patent may be obtained for five cents each, by addressing the "Commissioner of Patents, Washington, D. C."